US011156631B2

(12) United States Patent
Thompson et al.

(10) Patent No.: US 11,156,631 B2
(45) Date of Patent: Oct. 26, 2021

(54) SENSOR SELF-CALIBRATION

(71) Applicant: INVENSENSE, INC., San Jose, CA (US)

(72) Inventors: Matthew Julian Thompson, Beaverton, OR (US); David deKoninck, San Jose, CA (US); Sarah Nitzan, Palo Alto, CA (US); Houri Johari-Galle, San Jose, CA (US)

(73) Assignee: INVENSENSE, INC., San Jose, CA (US)

( * ) Notice: Subject to any disclaimer, the term of this patent is extended or adjusted under 35 U.S.C. 154(b) by 252 days.

(21) Appl. No.: 16/206,882

(22) Filed: Nov. 30, 2018

(65) Prior Publication Data

US 2019/0187172 A1 Jun. 20, 2019

Related U.S. Application Data

(60) Provisional application No. 62/598,983, filed on Dec. 14, 2017.

(51) Int. Cl.
*G01P 21/00* (2006.01)
*G01P 15/125* (2006.01)
*G01C 25/00* (2006.01)

(52) U.S. Cl.
CPC .............. *G01P 21/00* (2013.01); *G01C 25/00* (2013.01); *G01P 15/125* (2013.01)

(58) Field of Classification Search
CPC ....... G01P 21/00; G01P 15/125; G01C 25/00; G01C 25/005; G01N 33/0006; G01N 27/4163; G01N 27/42165; G01N 33/007; G01N 27/9086; B25J 9/1692; G01R 35/005; G01V 13/00; G01L 25/00; G01L 27/00

USPC ............ 73/1.01–1.89; 374/1–3; 702/85–107; 324/202, 750.02, 601, 74, 130; 250/252.1; 356/228
See application file for complete search history.

(56) References Cited

U.S. PATENT DOCUMENTS 5,965,807 A * 10/1999 Yamashita ............ G01D 18/004
701/70

OTHER PUBLICATIONS

Xie, Hui-Kai. "EEL5225: Principles of MEMS Transducers (Fall 2003)" University of Florida Lecture 22, Oct. 15, 2003, 21 pages.

* cited by examiner

*Primary Examiner* — Robert R Raevis
(74) *Attorney, Agent, or Firm* — Amin, Turocy & Watson, LLP

(57) ABSTRACT

Facilitating self-calibration of a sensor device via modification of a sensitivity of the sensor device is presented herein. A sensor system can comprise a sensor component comprising a sensor that generates an output signal based on an external excitation of the sensor; a sensitivity modification component that modifies a sensitivity of the sensor by a defined amount; and a calibration component that measures a first output value of the output signal before a modification of the sensitivity by the defined amount, measures a second output value of the output signal after the modification of the sensitivity by the defined amount, and determines, based on a difference between the first output value and the second output value, an offset portion of the output signal. Further, the calibration component can modify, based on the offset portion, the output signal.

23 Claims, 11 Drawing Sheets

SENSOR SELF-CALIBRATION

RELATED APPLICATION

This patent application claims priority to U.S. Provisional Patent Application No. 62/598,983, filed Dec. 14, 2017, and entitled "SENSOR SELF CALIBRATION," the entirety of which application is hereby incorporated by reference herein.

TECHNICAL FIELD

The subject disclosure generally relates to embodiments for facilitating self-calibration of a sensor device.

BACKGROUND

Conventional sensor technologies manually calibrate sensors during production, e.g., to overcome production induced defect(s) of the sensor. For example, such calibration of an accelerometer is performed by measuring acceleration from gravity, flipping the accelerometer during production, and remeasuring the acceleration. Further, one-time programmable elements of the accelerometer can be programmed, based on such measurements, to account for the production induced defect(s).

Unfortunately, one-time calibration of a sensor is time consuming, costly, and cannot account for shifts and/or changes of performance of the sensor over time due to, e.g., changes in temperature, changes in humidity, excessive forces being applied to the sensor, structural changes of components of the sensor, etc. In this regard, conventional sensor technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
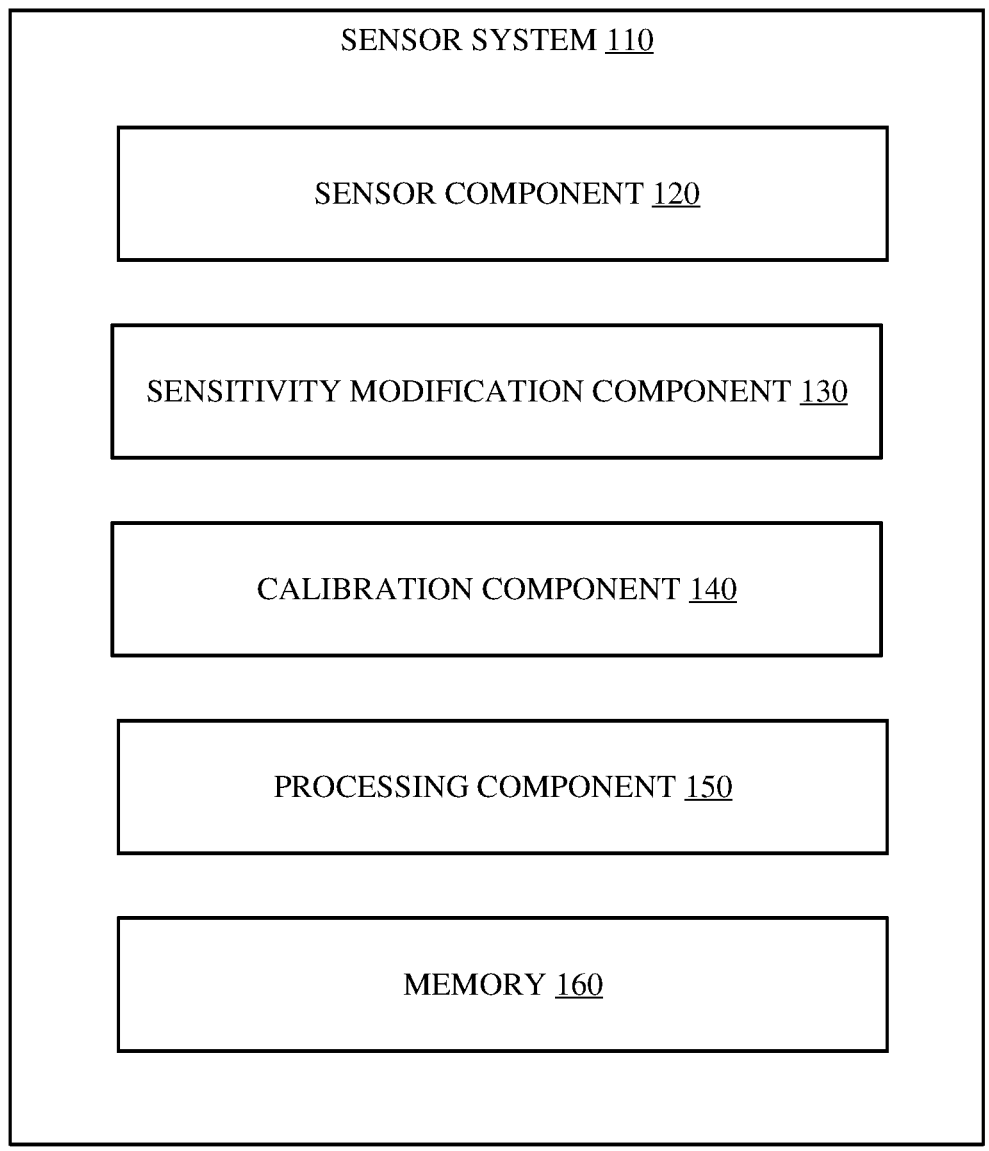
FIG. 1 illustrates a block diagram of a sensor system that facilitates self-calibration of a sensor device via modification of a sensitivity of the sensor device, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional senor technologies can perform one-time calibration of a sensor device during its production. For example, a flip tester can change an acceleration, e.g., gravity, being applied to an accelerometer by flipping the accelerometer during production testing, and calibrating the accelerometer based on measurements performed during such testing. However, such calibration is costly and time consuming. Further, performance of a sensor can shift after calibration due to structural changes that are inherent and/or caused by fabrication and environmental conditions, e.g., temperature, humidity, pressure, etc. On the other hand, various embodiments disclosed herein can facilitate self-calibration of a sensor device by varying a sensitivity of the sensor device.

For example, a system, e.g., sensor system, can comprise a sensor component comprising a sensor, a MEMS sensor, etc. that generates an output signal based on an external excitation of the sensor. In this regard, in various embodiments, the sensor can comprise an accelerometer, a gyroscope, a magnetometer, a barometer, a microphone, a pressure sensor, a gas sensor, etc.

Further, the system can comprise a sensitivity modification component that modifies the sensitivity of the sensor by a defined amount; and a calibration component that measures a first output value of the output signal before a modification of the sensitivity by the defined amount, measures a second output value of the output signal after the modification of the sensitivity by the defined amount, and determines, based on a difference between the first output value and the second output value, an offset portion of the output signal. Further, the calibration component can modify, calibrate, etc. the output signal based on the offset portion, e.g., by setting, programming, etc. one or more components, devices, etc. of the sensor to minimize an effect of the offset portion on the output signal.

In one embodiment, the sensitivity modification component can comprise a mechanical sensitivity component, a sense element sensitivity component, an analog circuit sensitivity component, and a digital circuit sensitivity component. In turn, the sensor can comprise a MEMS sensor comprising mechanical transduction and sense element transduction. Further, an output of the MEMS sensor can be coupled to a complementary metal-oxide-semiconductor (CMOS) circuit of the sensor system—the CMOS circuit comprising analog transduction and digital transduction. It should be appreciated that transduction as described herein can refer to a process by which an element of a device, a circuit, a component, etc. converts one type of energy, signal, etc. to another type of energy, signal, etc.

In this regard, in embodiment(s), the mechanical sensitivity component can modify, via electrostatic spring softening, beam strain stiffening, etc. a mechanical sensitivity gain of the mechanical transduction of the MEMS sensor, e.g., facilitating modification, via the calibration component, of a gain of the output signal of the sensor. For example, the mechanical sensitivity component can modify the mechanical sensitivity gain using electrodes that are coupled, e.g., via capacitors, to the MEMS sensor.

In other embodiment(s), the sense element sensitivity component can modify, via switched capacitors, a sense element gain of the sense element transduction of the MEMS sensor, e.g., facilitating the modification of the gain of the output signal. For example, the sense element sensitivity component can modify the sense element gain by switching respective capacitive sense element(s) on/off.

In embodiment(s), the analog circuit sensitivity component can modify a circuit gain of the analog transduction of the CMOS circuit, e.g., facilitating the modification of the gain of the output signal. For example, the analog circuit sensitivity component can modify, via switchable feedback capacitors, the circuit gain of an analog capacitive-to-voltage converter (C2V) of the analog transduction.

In other embodiment(s), the digital circuit sensitivity component can modify a digital gain of the digital transduction of the CMOS circuit, e.g., facilitating the modification of the gain of the output signal. For example, the digital circuit sensitivity component can modify a digital gain of an analog-to-digital converter (ADC) of the digital transduction.

In another embodiment, the system can further comprise a force-based offset component that minimizes respective contributions of force-based offsets resulting from respective exogenous stimuli other than a sense stimulus, desired sense stimulus, etc. For example, in one embodiment, the force-based offset component can apply a force to the sensor via an electrostatic force actuator within the mechanical transduction of the MEMS sensor. In this regard, the force-based offset component can apply optimal voltage(s) (e.g., that minimize undesired force(s) corresponding to the respective exogenous stimuli) to the electrostatic force actuator, e.g., to minimize force(s) resulting from cavity charging. In another embodiment, the forced based offset component can apply a charge to an electrode within mechanical transduction to facilitate modification, calibration, etc. of the output of the sensor.

In another embodiment, the exogenous stimuli can comprise a self-induced thermal force corresponding to a thermal load on the MEMS sensor—caused by operation of the CMOS circuit. In this regard, the force-based offset component can measure respective changes in the output of the sensor corresponding to different operating modes of the sensor—the different operating modes corresponding to different supply powers that generate different thermal loading on the MEMS sensor; and based on the respective changes in the output of the sensor, the force-based offset component can modify, via the different operating modes, the output of the sensor to minimize the effects on the output of the sensor caused by respective self-induced thermal forces corresponding to operation of the CMOS circuit.

In an embodiment, a method comprises varying, by a system comprising a processing component, a sensitivity of a sensor of the system. In this regard, the system generates, based on the sensitivity, an output signal representing an external force, stimulus, etc. that has been applied to the sensor; and in response to the varying the sensitivity, determining, by the system, an offset component of the output signal, and modifying, by the system based on the offset component, the output signal.

In embodiment(s), the varying comprises varying a mechanical sensitivity of the sensor using an electrode, e.g., coupled to a capacitor, within a mechanical transduction of the sensor. In other embodiment(s), the varying the mechanical sensitivity comprises switching sense element(s), e.g., capacitive sense element(s), on/off within a sense element transduction of the sensor.

In yet other embodiment(s), the varying comprises varying a circuit gain of the sensor using a selectable capacitor, feedback capacitor, etc. within an analog transduction of the sensor, e.g., varying a gain of an analog C2V converter of the analog transduction of the sensor.

In embodiment(s), the varying comprises varying a digital gain of a digital transduction of the sensor, e.g., varying a gain of an ADC converter of the digital transduction of the sensor.

In another embodiment, the method further comprises reducing, by the system, a contribution of a force-based offset to the output signal—the force-based offsets being induced via an exogenous stimulus, e.g., a charging force, a thermal force, etc.

In yet another embodiment, the method further comprises: in response to applying a stimulus voltage to a plate of capacitive plates of the sensor, determining, by the system, a distance of a gap between the capacitive plates; and based on the distance of the gap, determining, by the system, a derived sensitivity of the sensor.

In an embodiment, the method further comprises: in response to applying a defined stimulus voltage to the sensor, measuring, by the system, a measured controlled force corresponding to the sensor; determining, by the system based on the derived sensitivity and the defined stimulus voltage, an expected controlled force; and in response to determining a difference between the measured controlled force and the expected controlled force, modifying, by the system based on the difference, the sensitivity.

In an embodiment, a MEMS device comprises a sensor component comprising a sensor that generates an output signal based on an external force, stimulus, etc. that has been applied to the MEMS device; a sensitivity modification component that modifies a sensitivity of the sensor by a defined amount; and a calibration component that determines, based on a modification of the sensitivity by the defined amount, an offset portion of the output signal, and modifies the output signal based on the offset portion.

In another embodiment, the sensitivity comprises a mechanical sensitivity with respect to, e.g., an electrostatic spring softening of a capacitor of the sensor, a beam strain stiffening of the sensor, etc.; an electrical sensitivity, a sense element sensitivity, etc. corresponding to, e.g., a programmable capacitance of the sensor; a programmable circuit gain, digital gain, etc. of the sensor, etc.

In yet another embodiment, the calibration component can determine a forced based offset—resulting from an exogenous stimulus, other than the sense stimulus—that has been induced in the output signal; and modify the output signal based on the forced based offset.

Various embodiments disclosed herein can facilitate self-calibration of a sensor of a sensor device by varying a sensitivity of the sensor.

Referring now to FIG. 1, a block diagram (100) of a sensor system (110) that facilitates self-calibration, via a processing component (150) and a memory (160), of a sensor device (not shown) of a sensor component (120) is illustrated, in accordance with various example embodiments. The sensor component can comprise a sensor, a MEMS sensor, etc. (see, e.g., FIG. 3) that generates an output signal based on an external excitation of the sensor. In this regard, the sensor can comprise an accelerometer, a gyroscope, a magnetometer, a barometer, a microphone, a gas sensor, a pressure sensor, etc. In embodiment(s), the sensor component can comprise more than one sensor, different types of sensors, etc. Further, sensors of the sensor component can correspond to different axes, e.g., x, y, z, of the sensor system.

Figure 2:
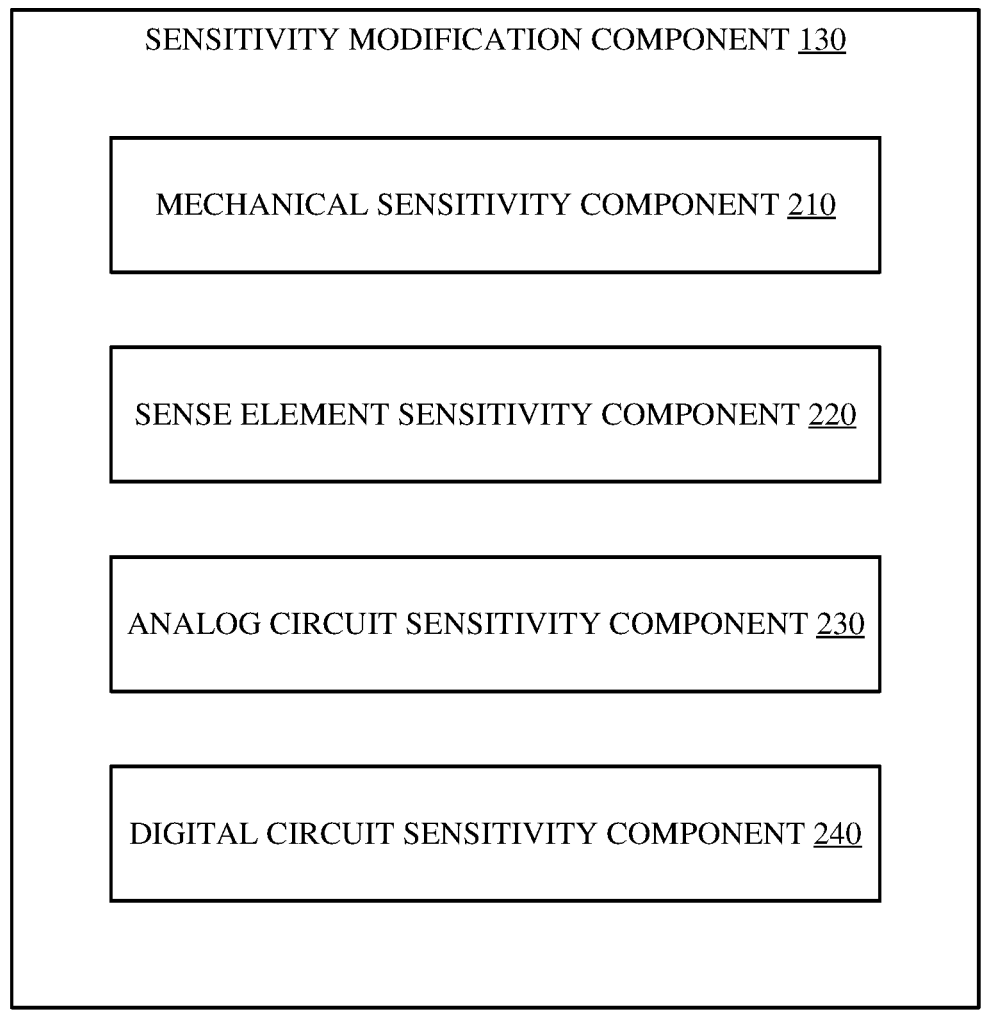
FIG. 2 illustrates a block diagram of a sensitivity modification component that facilitates self-calibration of a sensor device, in accordance with various example embodiments.
Figure 3:
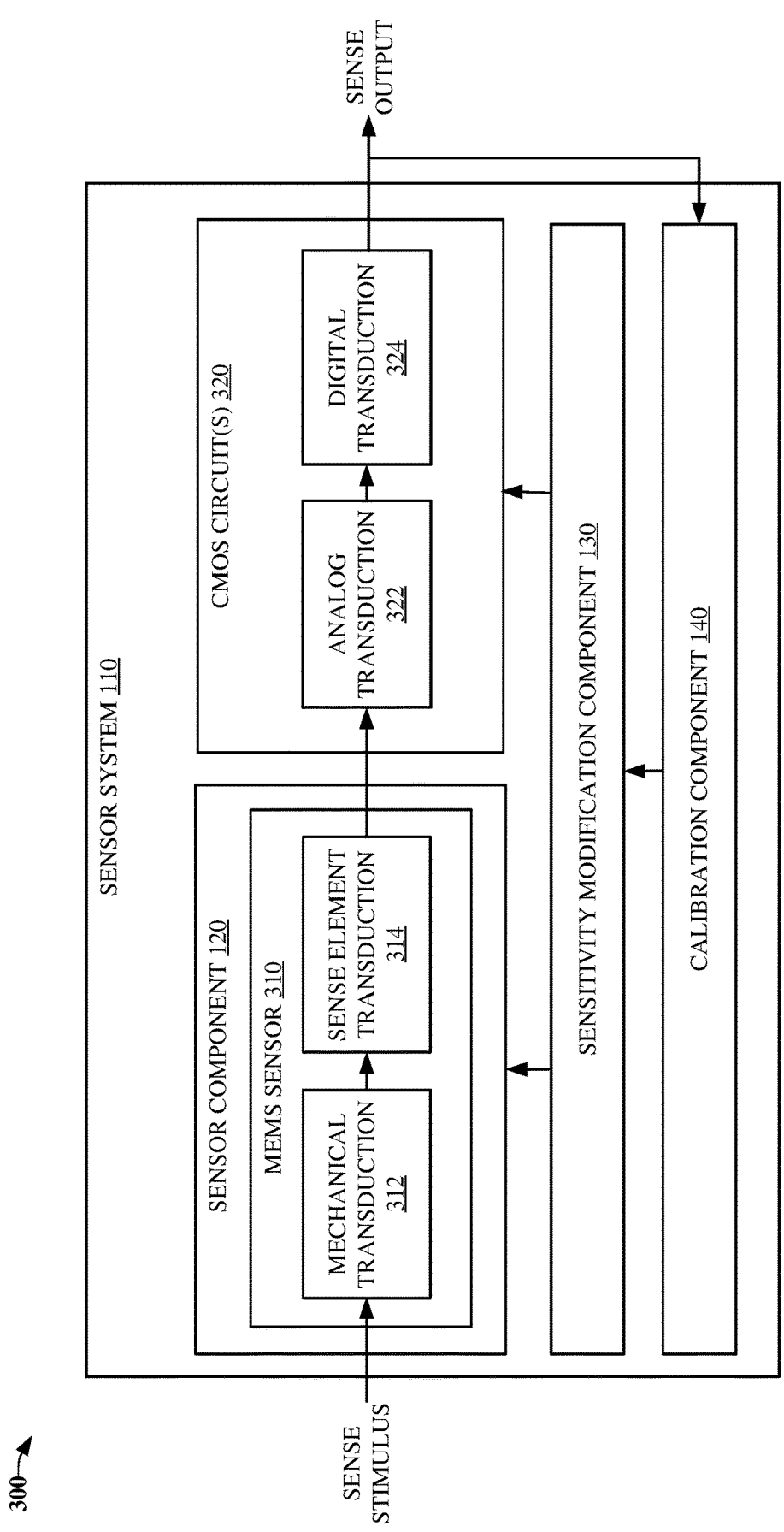
FIG. 3 illustrates a block diagram of a sensor system comprising a micro-electro-mechanical (MEMS) sensor coupled to complementary metal-oxide-semiconductor (CMOS) circuit(s), in accordance with various example embodiments.

A sensitivity modification component (130) of the sensor system can modify a sensitivity of the sensor by a defined amount. In this regard, and now referring to FIG. 2, the sensitivity modification component can comprise a mechanical sensitivity component (210), a sense element sensitivity component (220), an analog circuit sensitivity component (230), and a digital circuit sensitivity component (240). Referring now to FIG. 3, the mechanical sensitivity component can modify, via electrostatic spring softening, beam strain stiffening, etc. a mechanical sensitivity gain of a mechanical transduction (312) of a MEMS sensor (310) of the sensor component, e.g., using electrodes (not shown) that are coupled to a sensing element (e.g. capacitor (not shown)) of the MEMS sensor.

In another embodiment, the sense element sensitivity component can modify a sense element gain of a sense element transduction (314) of the MEMS sensor. For example, in one embodiment, the sense element sensitivity component can modify the sense element gain via switchable sensing element(s), e.g., capacitive sensing element(s).

In yet another embodiment, the analog circuit sensitivity component can modify a circuit gain of an analog transduction (322) of CMOS circuit(s) (320)—the CMOS circuit(s) coupled to the output signal of the MEMS sensor. For example, in one embodiment, the analog circuit sensitivity component can modify, via switchable capacitors, feedback capacitors, etc. (not shown) within a feedback path of an amplifier, operational amplifier, etc. (not shown), the circuit gain of the analog transduction, e.g., of an analog C2V converter of the CMOS circuit(s).

In another embodiment, the digital circuit sensitivity component can adjust a digital gain of a digital transduction (324) of the CMOS circuits of the sensor, e.g., a digital gain of an analog-to-digital conversion component, converter, etc. (not shown) of the sensor.

In turn, a calibration component (140) can measure a first output value, e.g., sense output, of the sensor system before a modification of the sensitivity by the defined amount. Further, the calibration component can measure a second output value of the sensor system after the modification of the sensitivity by the defined amount.

In embodiment(s), it should be appreciated that the following equations can be utilized by the calibration component:

$$g_{out} = \text{Sensitivity}(PM_{gee} + PM_{other\_forces}) + \text{offset}, \quad (1)$$

in which $g_{out}$ represents the sense output associated with acceleration, Sensitivity represents the sensitivity of the sensor, $PM_{gee}$ represents an acceleration force that is exerted on a proof mass (PM) of the MEMS sensor, $PM_{other\_forces}$ represents forces, other than acceleration, that have been exerted on the PM, and offset represents the offset portion of the sense output. Assuming $PM_{other\_forces} = 0$, $$g_{out,0} = g_{out,0} = \text{Sensitivity}(PM_{gee}) + \text{offset}, \quad (2)$$

$$g_{out,1} = (\text{Sensitivity} + \Delta Sen)(PM_{gee}) + \text{offset}. \quad (3)$$

$$g_{out,1} - g_{out,0} = \Delta Sen(PM_{gee}), \quad (4)$$

$$\text{offset} = g_{out,0} - \left(\frac{\text{sensitivity}}{\Delta Sen}\right)(g_{out,1} - g_{out,0}) \quad (5)$$

in which $g_{out,0}$ and $g_{out,1}$ represent respective output values of the sense output of the sensor system—measured before modification of the sensitivity and after modification of the sensitivity, respectively. Further, $\Delta Sen$ represents the defined amount of sensitivity that has been changed, modified, etc.

In this regard, the calibration component can determine, via the processing component based on the difference between the first output value and the second output value (e.g., $g_{out,1} - g_{out,0}$), the offset portion of the sense output of the sensor system. Further, the calibration component can modify, calibrate, etc., via the processing component, the sense output based on the offset portion, e.g., by setting, programming, resetting, reprogramming, etc. one or more components, devices, etc. (not shown) of the memory (160), e.g., comprising flip-flops (FFs), latches, volatile memory, non-volatile memory, etc. that are communicatively coupled to device(s), e.g., electrodes, resistors, capacitances, switchable capacitances, etc. (not shown) of the sensor component, the CMOS circuit(s), etc., e.g., to minimize an effect, e.g., reduce a value, of the offset portion on the sense output of the sensor system.

In embodiment(s), the sensitivity modification component can trim, change, modify, etc. the sensitivity of the MEMS sensor, e.g., to facilitate calibration, modification, etc. of the sense output, e.g., due to changes in the sense output caused by physical changes in a structure of the MEMS sensor, e.g., caused by a change in a gap between plates of a capacitor of the MEMS sensor; due to changes in the sense output caused by environmental changes, e.g., temperature, humidity, etc.

It should be appreciated that the following equation can be utilized by the sensitivity modification component in various embodiments:

$$\text{Sensitivity} \, \alpha \frac{FAVM}{gap^2 K}, \quad (6)$$

in which A represents a sense electrode area of a capacitance-based sensor, V represents a voltage across capacitive plates of the capacitance-based sensor, M represents an effective mass of the capacitance-based sensor, K represents a spring stiffness of the capacitance-based sensor, and gap represents a distance between capacitive plates of the capacitance-based sensor.

In this regard, in an embodiment, in response to applying a first voltage to a first plate of capacitive plates of the MEMS sensor, the sensitivity modification component can determine a second voltage, charge, etc. that has been induced on a second plate of the capacitive plates. Further, based on the first voltage and the second voltage, the sensitivity modification component can determine the gap. In turn, based on the gap, the sensitivity modification component can determine, derive, etc. a derived sensitivity of the MEMS sensor.

Further, based on the derived sensitivity and a defined stimulus voltage, the sensitivity modification component can determine an expected controlled force corresponding to the MEMS sensor. Further, in response to applying the defined stimulus voltage to the MEMS sensor, the sensitivity modification component can determine a measured controlled force corresponding to the MEMS sensor. In turn, the sensitivity modification component can determine a difference between the expected controlled force and the measured controlled force, and based on the difference, modify the sensitivity to facilitate the calibration of the sense output.

In embodiment(s), the sensitivity modification component can modify the sensitivity before operations, described herein, are performed by the calibration component and/or the force-based offset component. In other embodiments(s), the sensitivity modification component can modify the sensitivity after the operations are performed by the calibration component and/or the force-based offset component. In yet other embodiment(s), the sensitivity modification component can modify the sensitivity both before and after respective operations are performed by the calibration component and/or the force-based offset component.

Figure 4:
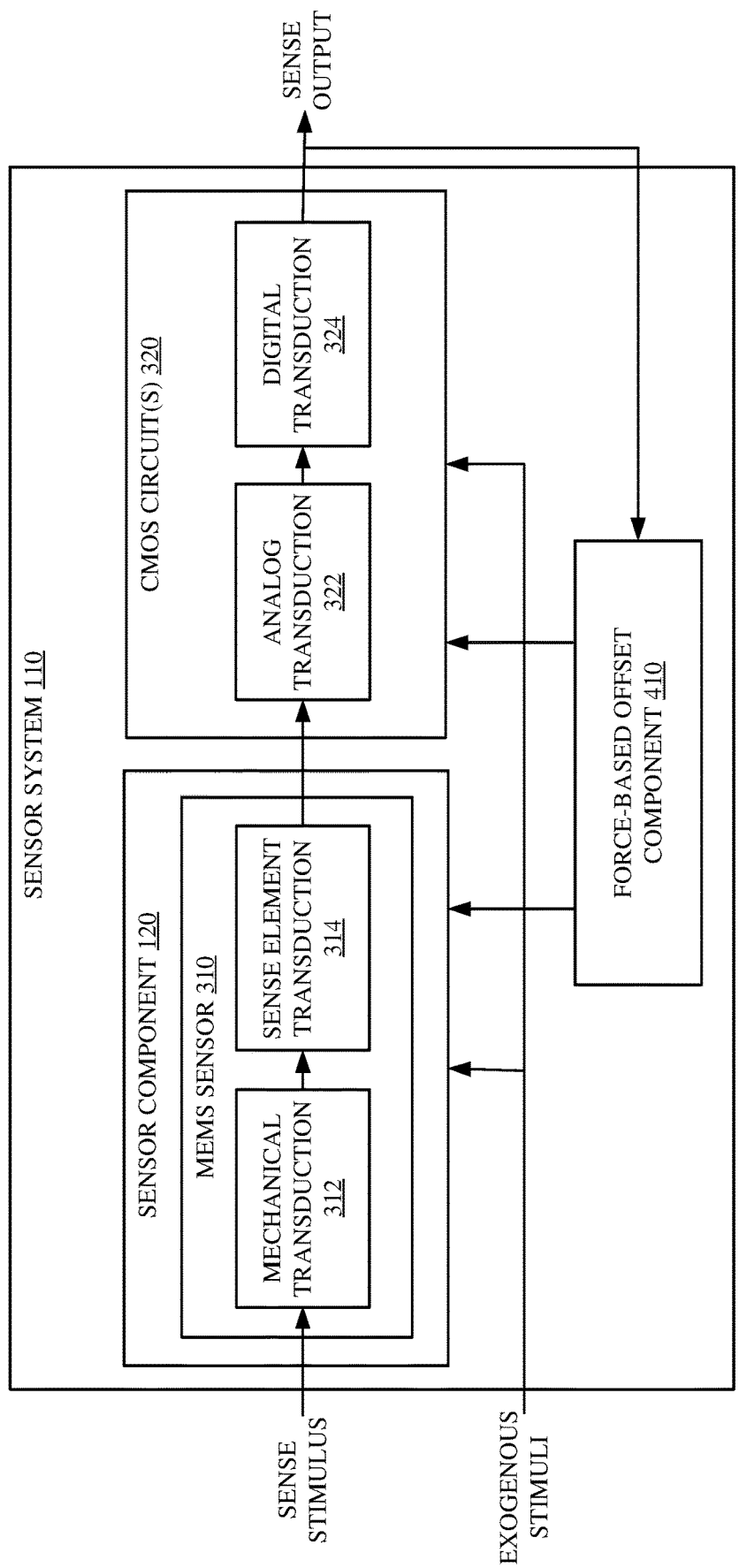
FIG. 4 illustrates a block diagram of a sensor system comprising a force-based offset component that facilitates reducing effects of respective exogenous stimuli, other than a desired sense stimulus, on a sense output of the sensor system, in accordance with various example embodiments.

Now referring to FIG. 4, a forced-based offset component (410) of the sensor system can minimize respective contributions of force-based offsets resulting from respective exogenous stimuli, other than a sense stimulus, desired sense stimulus, etc. that have been exerted on the sensor system, e.g., the PM, the CMOS circuit(s), etc. For example, in one embodiment, the force-based offsets can comprise a force-based offset generated by a charging force corresponding to a capacitance of the sensor, e.g., resulting from cavity charging. In this regard, the force-based offset component can apply different charges to an electrode, electrostatic force actuator, etc. of the sensor, e.g., within the mechanical transduction of the MEMS sensor. Further, in response to a charge of the different charges being determined to minimize the charging force, the forced-based offset component can apply the charge to the electrode, the electrostatic force actuator, etc., e.g., to facilitate modification, calibration, etc. of the sense output of the sensor system, e.g., to minimize the force-based offset generated by the charging force.

In another embodiment, the force-based offsets can comprise a force-based offset generated by a thermal force, self-induced thermal force, etc. corresponding to a thermal load on the sensor system. In this regard, the force-based offset component can measure respective changes in the sense output of the sensor system corresponding to different operating modes (e.g., corresponding to different operating temperatures, thermal loading, etc.) of the sensor system; and based on the respective changes in the sensor output, modify the sensor output of the sensor system, e.g., via the different operating modes, to minimize the effects of self-induced thermal forces on the sense output of the sensor system.

For example, the force-based offset component can store, via the processing component, values, trim values, etc. in the memory—such values corresponding to the different operating modes of the sensor system. In turn, the processing component can set, program, reset, reprogram, etc. one or more components, devices, etc. (not shown) of the memory with the values, trim values, etc. based on a corresponding operating mode of the different operating modes of the sensor system, e.g., to reduce the force-based offset generated by the thermal force, self-induced thermal force, etc.

Figure 5:
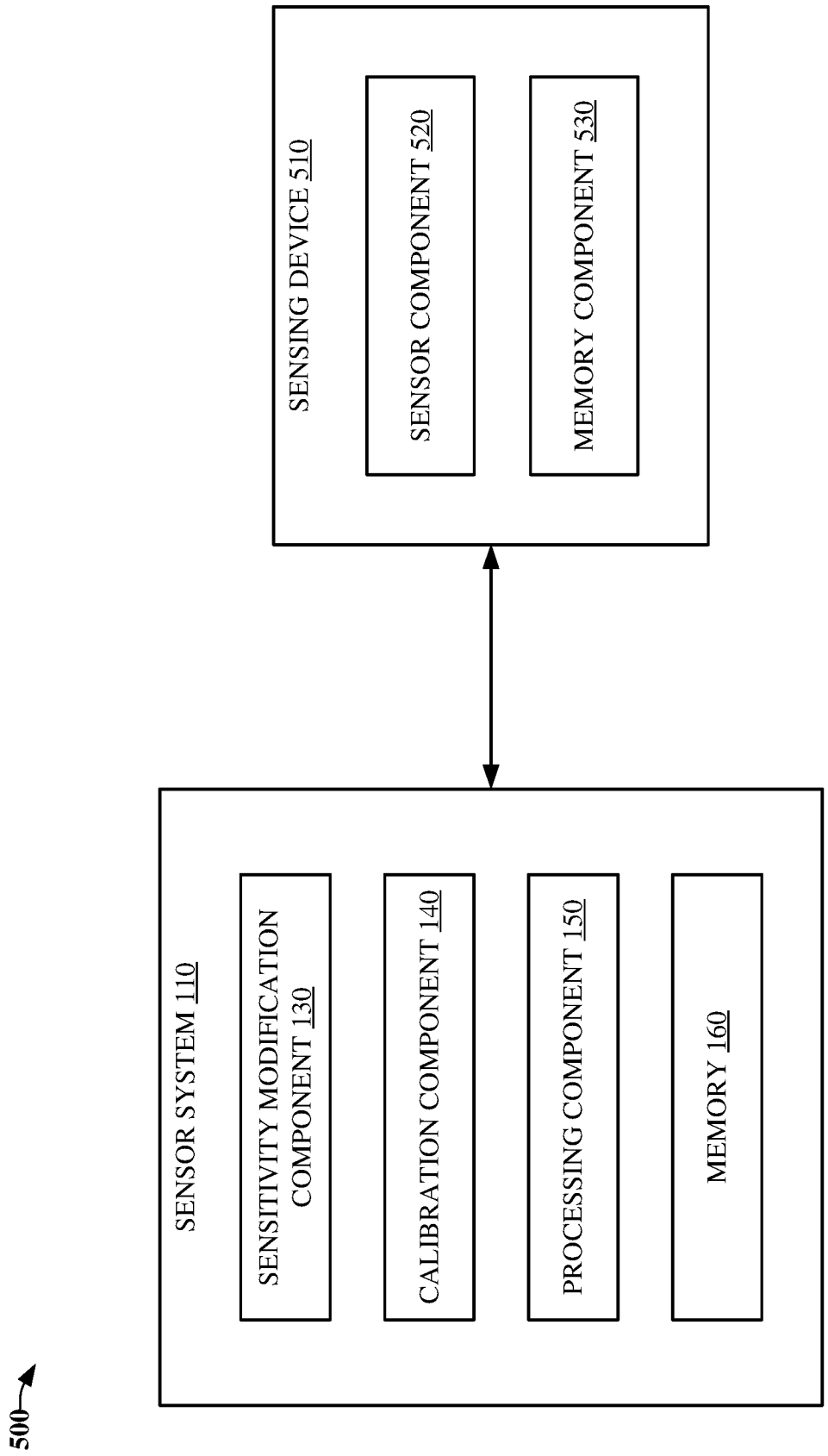
FIG. 5 illustrates a block diagram of a sensor system that calibrates a sensing device by varying its sensitivity, in accordance with various example embodiments.

Referring now to embodiment(s) illustrated by FIG. 5, the sensor system can be separate, e.g., located off chip, on a separate device, etc. from a sensing device (510), e.g., a sensor, a MEMS sensor, etc. In this regard, the sensor system can be communicatively coupled to the sensing device via a wired and/or wireless communication protocol, and the sensitivity modification component, the calibration component, etc. can perform corresponding operations described herein via instructions, commands, data, etc. communicated to/from the sensing device.

In other embodiment(s), the sensitivity modification component and the calibration component can perform the corresponding operations for more than one axis of the sensor system. In this regard, the sensor component (520) can comprise a group of sensors comprising the sensor that correspond to respective axes of the sensor. In an embodiment, the group of sensors can comprise a same type of sensor, e.g., accelerometer, gyroscope, etc. for each axis. In another embodiment, the group of sensors can comprise different types of sensors for each axis.

In yet another embodiment, the sensor component can comprise a group of output signals comprising the sense output and corresponding to the respective axes of the sensor. In this regard, the calibration component can modify the group of output signals based on a defined magnitude vector of the group of output signals with respect to a known force being applied to the sensor system. For example, the calibration component can calibrate, as described herein, each axis output of a 3-axis sensor, so that a resulting magnitude vector of outputs of the 3 axes equals a defined magnitude vector of the group of output signals, e.g., with respect to gravity being applied to the sensor, e.g., within a defined error tolerance, e.g., 2%, etc.

In embodiment(s), operations performed by the sensor system for facilitating self-calibration of the sensor can be enabled/disabled, e.g., based on a defined condition. In this regard, the defined condition can comprise a defined event and/or a defined environmental condition. For example, the defined event can comprise: a power up of the sensor system; a defined operational state of the sensor system (e.g., sleep mode, low power mode, etc.); a detected period of non-movement of the sensor system; a detected acceleration (e.g., corresponding to a drop, fall, high acceleration event, e.g., granter than 5 times gravity (5 Gs), etc.) of the sensor system; a detected temperature corresponding to the sensor system; a detected humidity corresponding to the sensor system; a detected time of operation of the sensor system, e.g., 1 year; a detected customer initiated request for calibration, etc.

FIGS. 6-11 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Figure 6:
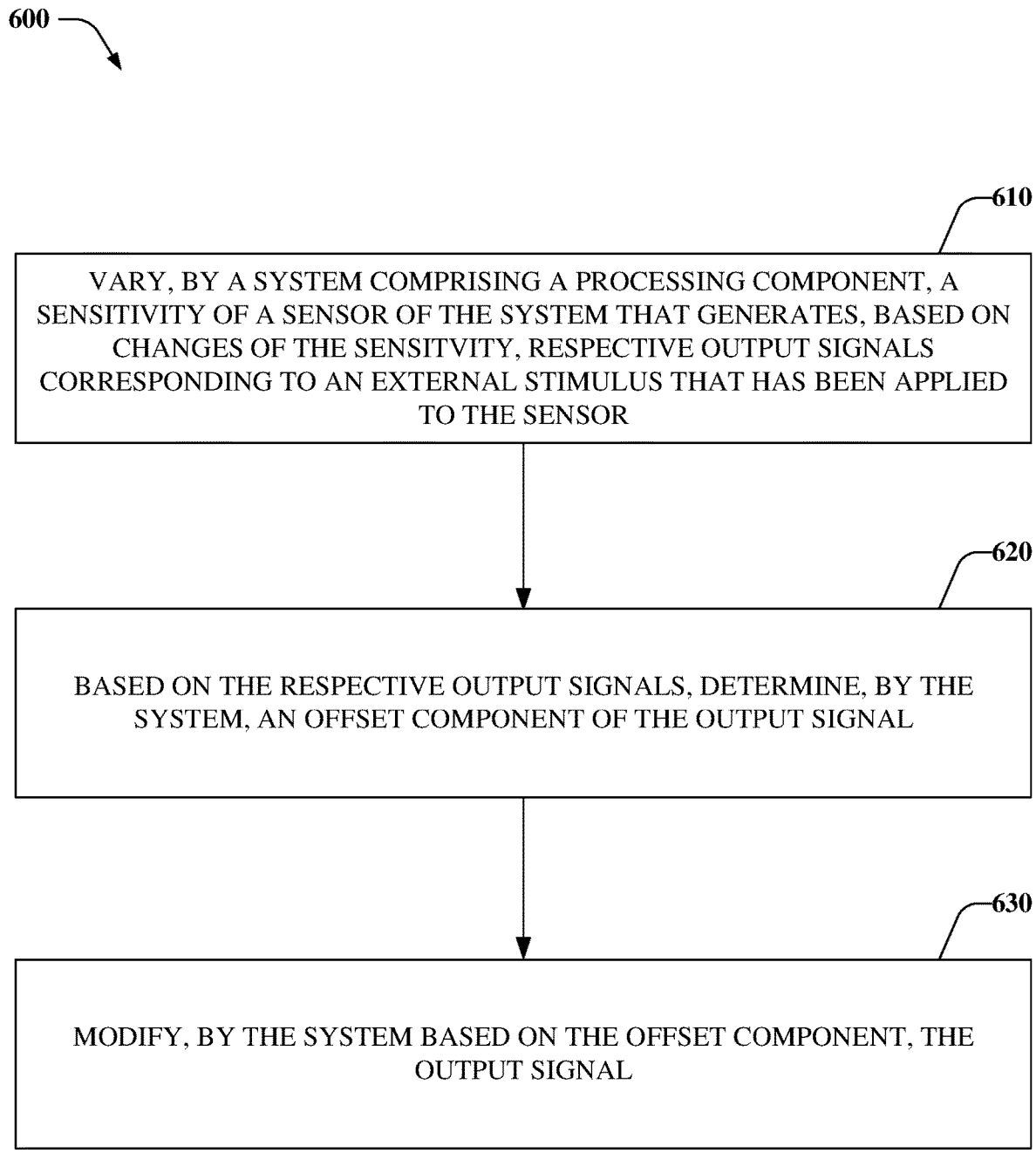
FIG. 6 illustrates a flowchart of a method associated with a sensor system that facilitates self-calibration of a sensor device via modification of a sensitivity of the sensor device, in accordance with various example embodiments.

FIG. 6 illustrates a flowchart of a method associated with a system (e.g., 110) that facilitates self-calibration of a sensor device by varying a sensitivity of the sensor device, in accordance with various example embodiments. At 610, the system can vary a sensitivity of a sensor of the system that generates, based on changes of the sensitivity, respective output signals corresponding to an external force, excitation, stimulus, etc. that has been applied to the sensor. At 620, the system can determine, based on the respective output signals, an offset component of the output signal. At 630, the system can modify, based on the offset component, the output signal.

Figure 7:
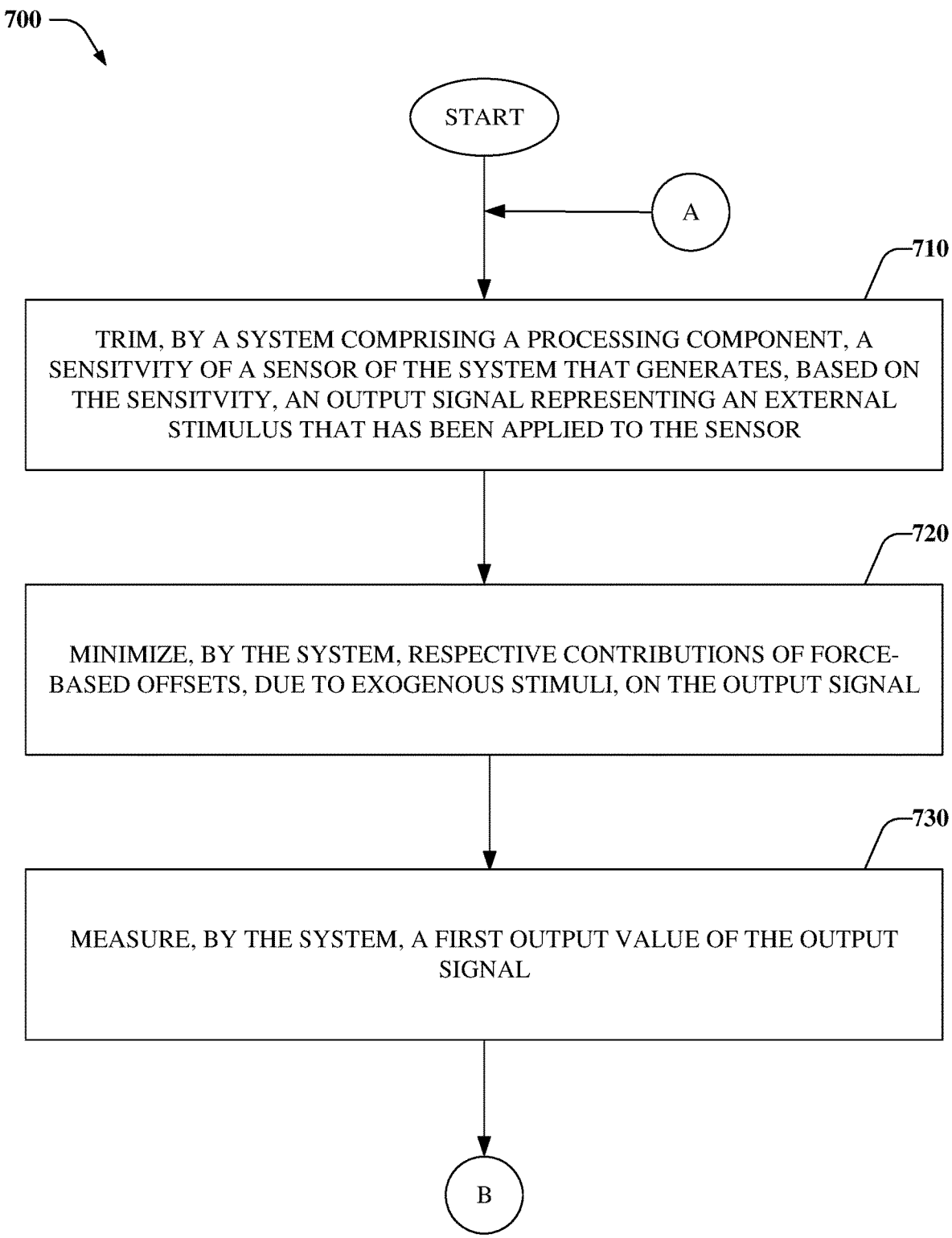
FIGS. 7-9 illustrate flowcharts of another method associated with a sensor system that facilitates self-calibration of a sensor device via modification of a sensitivity of the sensor device, in accordance with various example embodiments.
Figure 8:
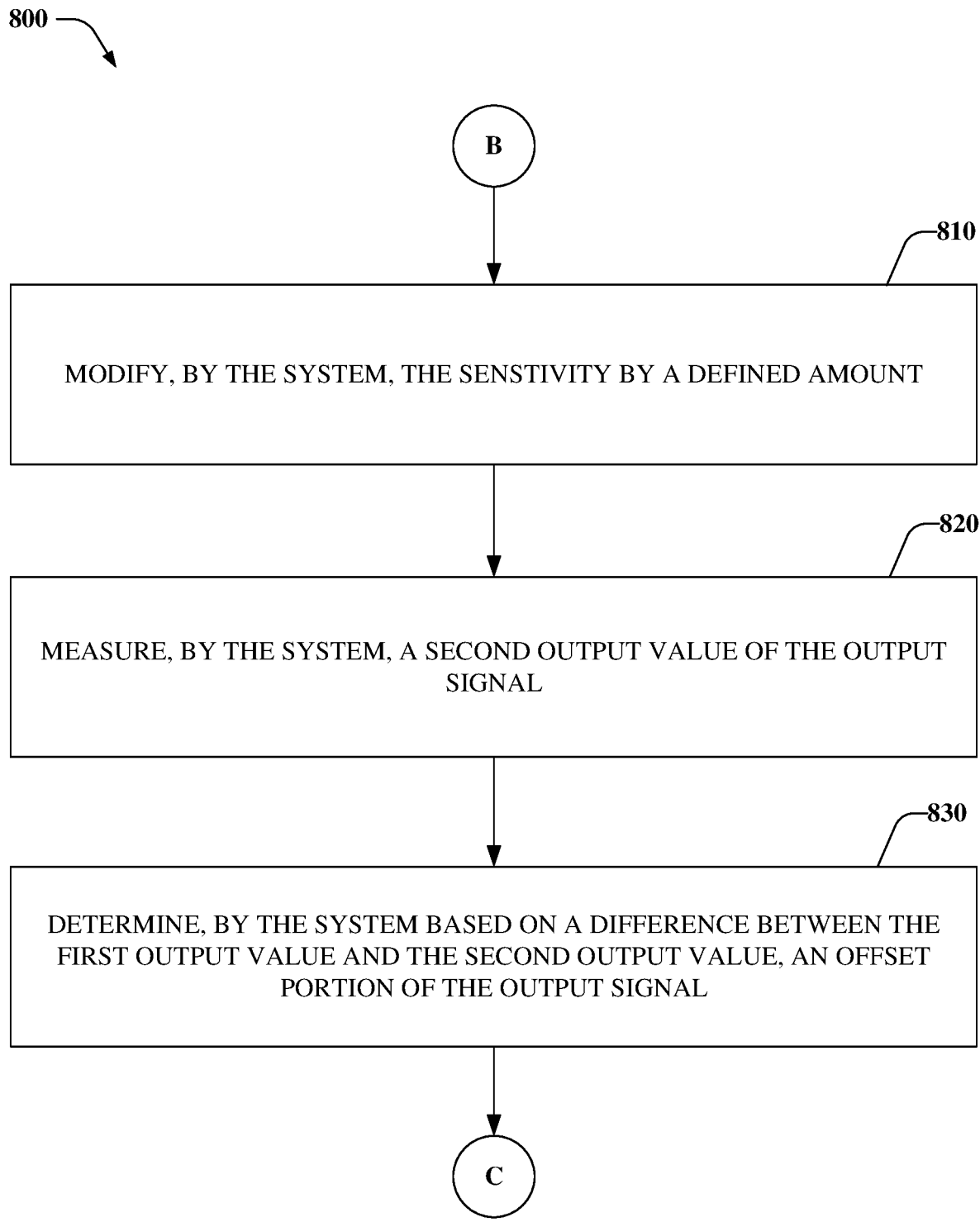
Figure 9:
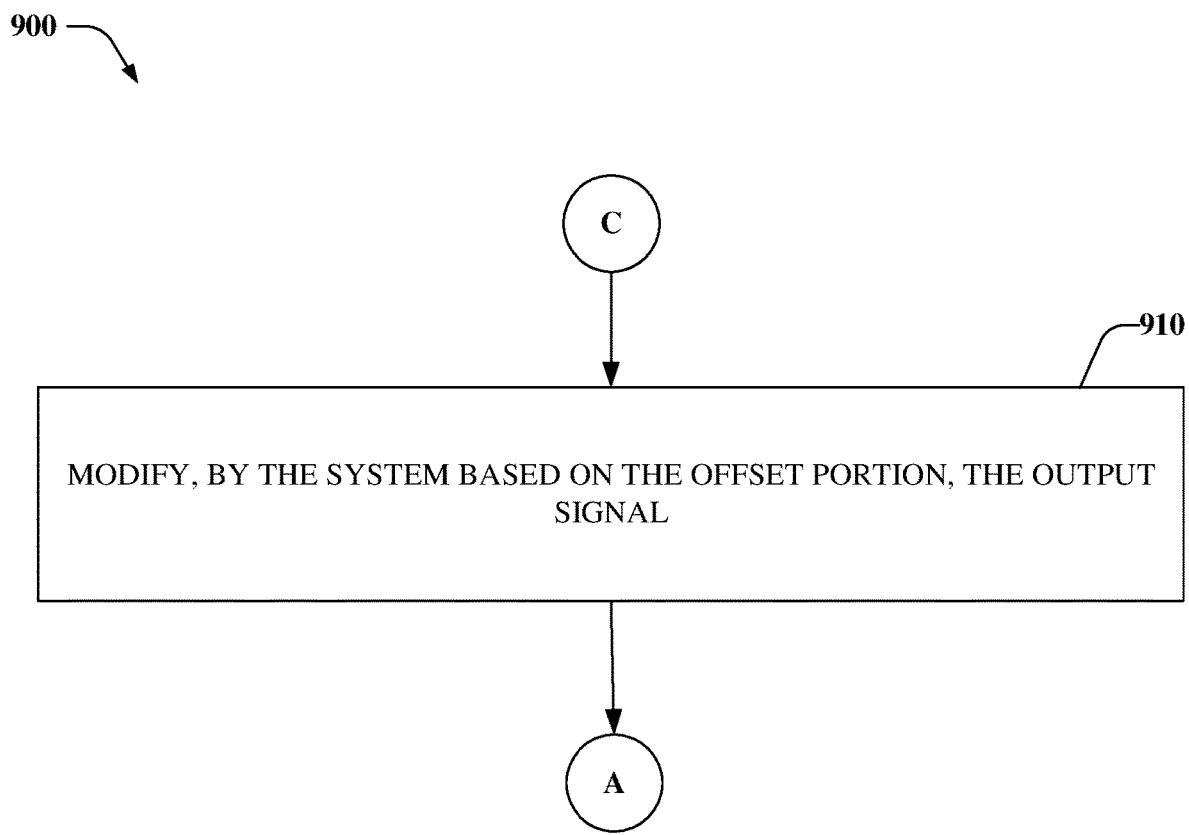

FIGS. 7-9 illustrate flowcharts of another method associated with the system that facilitates self-calibration of the sensor device by varying the sensitivity of the sensor device, in accordance with various example embodiments. At 710, the system can trim a sensitivity of a sensor of the system—the sensor generating, based on the sensitivity, an output signal representing a force, excitation, etc. that has been applied to the sensor. At 720, the system can minimize respective contributions of force-based offsets, other than a sense stimulus, desired sense stimulus, etc., on the output signal. At 730, the system can measure, determine, etc. a first output value of the output signal.

Flow continues from 730 to 810, at which the system can modify the sensitivity by a defined amount. At 820, the system can measure, determine, etc. a second output value of the output signal. At 830, the system can determine, based on a difference between the first output value and the second output value, an offset portion of the output signal. Flow continues from 830 to 910, at which the system can modify the output signal based on the offset portion. In turn, flow returns to 710 from 910.

Figure 10:
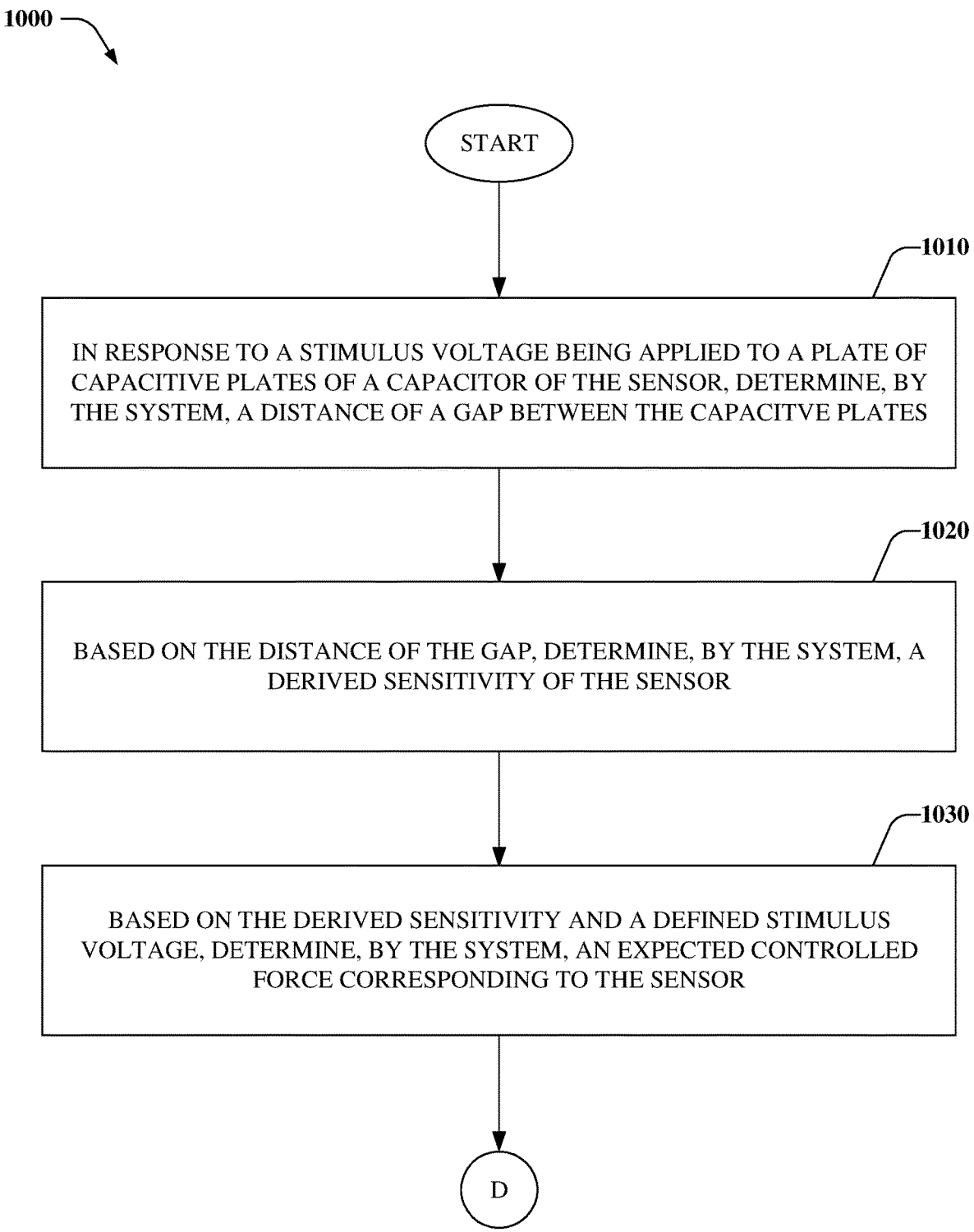
FIGS. 10-11 illustrate flowcharts of a method associated with trimming a sensitivity of a sensor device, in accordance with various example embodiments.
Figure 11:
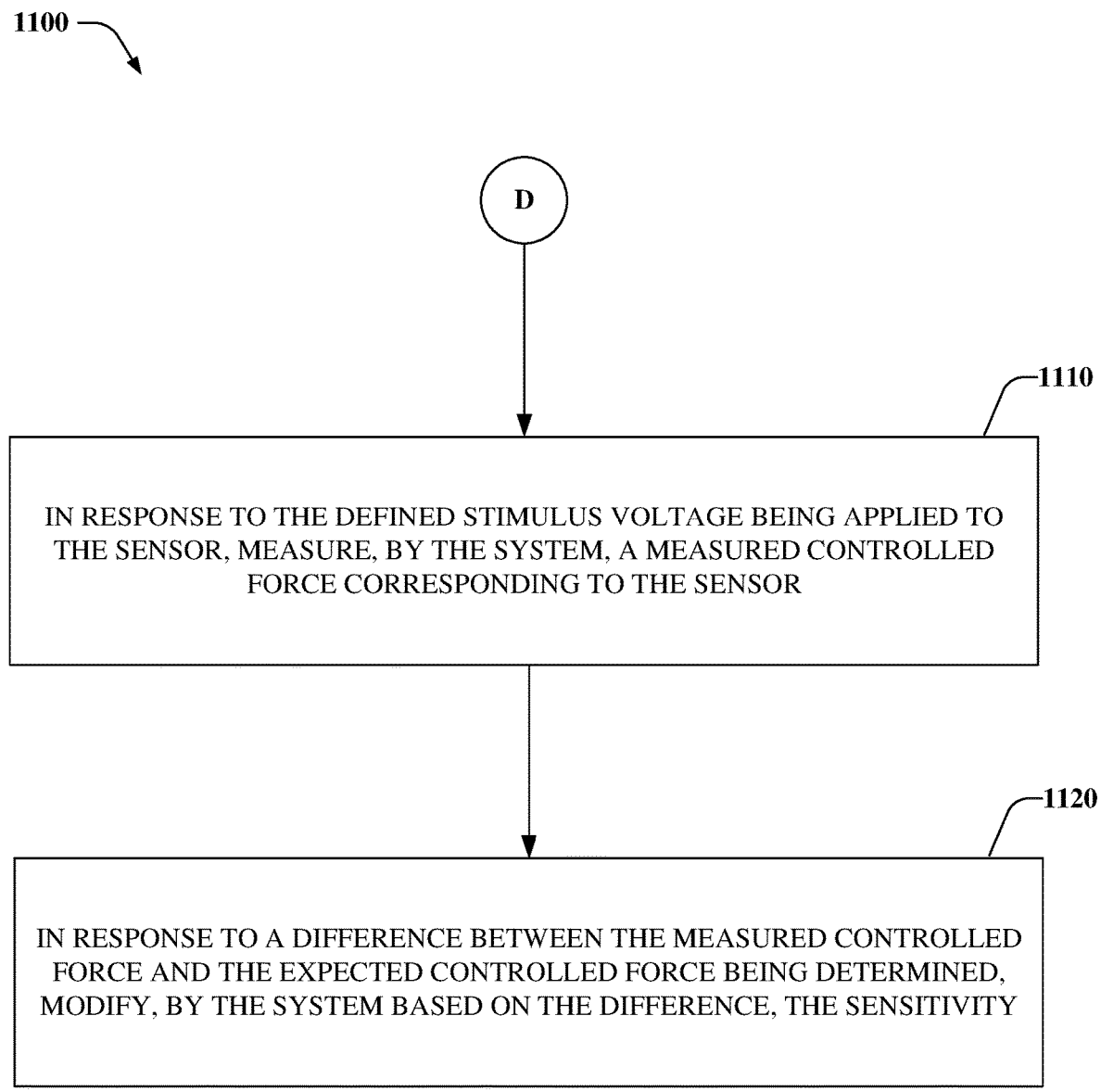

FIGS. 10-11 illustrate flowcharts of a method associated with trimming a sensitivity of the system that facilitates self-calibration of the sensor device by varying the sensitivity of the sensor device, in accordance with various example embodiments. At 1010, in response to a stimulus voltage being applied to a plate of capacitive plates of a capacitor of the sensor, the system can determine a distance of a gap between the capacitive plates. At 1020, the system can determine, based on the distance of the gap, a derived sensitivity of the sensor. At 1030, based on the derived sensitivity and a defined stimulus voltage, the system can determine an expected controlled force corresponding to the sensor.

At 1110, in response to the defined stimulus voltage being applied to the sensor, the system can measure a measured controlled force corresponding to the sensor. At 1120, in response to a difference between the measured controlled force and the expected controlled force being determined, the system can modify, based on the difference, the sensitivity.

As it employed in the subject specification, the term "component" refers to substantially any analog and/or digital based device(s), circuit(s), etc. comprising, e.g., a resistor, a capacitor, a transistor, a diode, an inductor, a memory, a programmable device, e.g., fuse, field programmable gate array (FPGA), complex programmable logic device (CPLD), etc. relevant to performing operations and/or functions of circuit(s), device(s), system(s), etc. disclosed herein. Further, the term "processing component" can refer to substantially any computing processing unit or device (e.g., MAC, etc.), comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), an FPGA, a programmable logic controller (PLC), a CPLD, a discrete gate or transistor logic, discrete hardware components, an analog circuit, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, the term "memory", "memory component", and substantially any other information storage component relevant to operation and functionality of system 110 and/or devices (e.g., sensing device 510) disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable programmable ROM (EEPROM), or flash memory. Additionally, the components and/or devices disclosed herein can comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of systems, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A sensor system, comprising:
a sensor that generates an output signal based on an external excitation of the sensor;
a processor; and
a memory that stores executable instructions that, when executed by the processor, facilitate performance of operations by the processor, the operations comprising:
modifying a sensitivity of the sensor by a defined amount, wherein the modifying of the sensitivity comprises at least one of
varying a mechanical sensitivity gain of the sensor using an electrode of the sensor,
varying a sensing element gain of the sensor using switchable sensing elements,
varying a circuit gain of an analog capacitive-to-voltage converter corresponding to the output signal of the sensor, or
varying a digital gain of an analog-to-digital converter corresponding to the output signal of the sensor;
measuring a first output value of the output signal of the sensor before a modification of the sensitivity of the sensor by the defined amount;
measuring a second output value of the output signal of the sensor after the modification of the sensitivity of the sensor by the defined amount;
determining, based on a difference between the first output value and the second output value, an offset portion of the output signal of the sensor; and
facilitating a self-calibration of the output signal of the sensor to minimize an effect of the offset portion on the output signal of the sensor.

2. The sensor system of claim 1, wherein the self-calibration comprises modifying, based on the offset portion, the output signal of the sensor.

3. The sensor system of claim 1, wherein the external excitation of the sensor comprises a mechanical excitation of the sensor, and wherein the varying of the mechanical sensitivity gain of the sensor using the electrode of the sensor comprises:
modifying, via electrostatic spring softening, a mechanical transduction of the sensor using the electrode of the sensor, wherein mechanical transduction comprises a conversion of the mechanical excitation of the sensor into the output signal of the sensor.

4. The sensor system of claim 1, wherein the varying of the sensing element gain of the sensor comprises:
modifying, via one or more switchable capacitors, a sense element transduction of the sensor to facilitate a modification of the sensing element gain of the sensor with respect to a generation, based on the external excitation of the sensor, of the output signal of the sensor.

5. The sensor system of claim 4, wherein the modifying of the sense element transduction of the sensor comprises:
modifying, via a switchable capacitor of the one or more switchable capacitors, a capacitance of the sensor.

6. The sensor system of claim 1, wherein the external excitation of the sensor is a desired stimulus, and wherein the operations further comprise:
minimizing respective contributions of force-based offsets resulting from respective exogenous stimuli other than the desired stimulus, wherein the respective exogenous stimuli comprise at least one of a charging force that has been generated via the sensor system or a thermal force that has been generated via the sensor system.

7. The sensor system of claim 6, wherein the charging force corresponds to a capacitance of the sensor.

8. The sensor system of claim 7, wherein the operations further comprise:
applying different charges to the electrode of the sensor; and
in response to a charge of the different charges being determined to minimize the charging force, applying the charge to the electrode to minimize the effect of the offset portion on the output signal.

9. The sensor system of claim 6, wherein the thermal force corresponds to a thermal load on the sensor.

10. The sensor system of claim 9, wherein the operations further comprise:
measuring respective changes in the output signal of the sensor corresponding to different operating modes of the sensor; and
based on the respective changes, modifying the output signal of the sensor in the different operating modes to minimize an effect of a force-based offset of the force-based offsets that has been generated by the thermal force.

11. The sensor system of claim 1, wherein the operations further comprise:
in response to a first voltage being applied to a first plate of capacitive plates of the sensor, determining a second voltage of a second plate of the capacitive plates;
based on the first voltage and the second voltage, determining a distance of a gap between the capacitive plates; and
based on the distance, determining a derived sensitivity of the sensor.

12. The sensor system of claim 11, wherein the operations further comprise:
based on the derived sensitivity and a defined stimulus voltage, determining an expected controlled force corresponding to the sensor; and
in response to the defined stimulus voltage being applied to the sensor, determining a measured controlled force corresponding to the sensor.

13. The sensor system of claim 12, wherein the operations further comprise:
  determining a difference between the expected controlled force and the measured controlled force; and
  based on the difference, modifying the sensitivity to facilitate the self-calibration of the output signal.

14. The sensor system of claim 1, wherein the sensor comprises an electro-mechanical based sensor.

15. The sensor system of claim 14, wherein the electro-mechanical based sensor comprises an accelerometer, a gyroscope, a magnetometer, a barometer, a microphone, a pressure sensor, or a gas sensor.

16. A method, comprising:
  varying, by a system comprising a processor, a sensitivity of a sensor of the system, wherein the system generates, based on changes of the sensitivity of the sensor, respective output signals corresponding to an external stimulus that has been applied to the sensor, and wherein the varying of the sensitivity of sensor comprises at least one of
    varying a mechanical sensitivity gain of the sensor using an electrode of the sensor,
    varying a sensing element gain of the sensor using switchable sensing elements,
    varying a circuit gain of an analog capacitive-to-voltage converter corresponding to the output signal of the sensor, or
    varying a digital gain of an analog-to-digital converter corresponding to the output signal of the sensor; and
  based on the respective output signals,
    determining, by the system, an offset portion of an output signal of the respective output signals, and
    modifying, by the system, the output signal to minimize an effect of the offset portion on the output signal.

17. The method of claim 16, further comprising:
  reducing, by the system, a contribution of a force-based offset to the output signal, wherein the force-based offset has been induced via a charging force.

18. The method of claim 16, further comprising:
  reducing, by the system, a contribution of a force-based offset to the output signal, wherein the force-based offset has been induced via a thermal force.

19. The method of claim 16, further comprising:
  in response to applying a stimulus voltage to a plate of capacitive plates of a capacitor of the sensor, determining, by the system, a distance of a gap between the capacitive plates; and
  based on the distance of the gap, determining, by the system, a derived sensitivity of the sensor.

20. The method of claim 19, further comprising:
  in response to applying a defined stimulus voltage to the sensor, measuring, by the system, a measured controlled force corresponding to the sensor;
  based on the derived sensitivity and the defined stimulus voltage, determining, by the system, an expected controlled force; and
  in response to determining a difference between the measured controlled force and the expected controlled force, modifying, by the system based on the difference, the sensitivity.

21. An electro-mechanical based device, comprising:
  a sensor that generates an output signal based on an external stimulus that has been applied to the electro-mechanical based device;
  a processor; and
  a memory that stores executable instructions that, when executed by the processor, facilitate performance of operations by the processor, the operations comprising:
    modifying a sensitivity of the sensor by a defined amount, wherein the modifying of the sensitivity comprises at least one of
      varying a mechanical sensitivity gain of the sensor using an electrode of the sensor, or
      varying a sensing element gain of the sensor using switchable sensing elements; and
    in response to the modifying of the sensitivity of the sensor by the defined amount,
      determining an offset portion of the output signal, and
      modifying the output signal to minimize an effect of the offset portion on the output signal.

22. The electro-mechanical based device of claim 21, wherein the
  mechanical sensitivity gain corresponds to electrostatic spring softening of the sensor, and wherein the sensing element gain corresponds to selectable sense elements of the sensor.

23. The electro-mechanical based device of claim 21, wherein the operations further comprise:
  determining a forced-based offset, other than an offset induced via the external stimulus, of the output signal; and
  based on the forced-based offset, modifying the output signal.

* * * * *